US012215785B1

(12) United States Patent
Hall et al.

(10) Patent No.: US 12,215,785 B1
(45) Date of Patent: Feb. 4, 2025

(54) SHIFT FORK LUBRICATION DRIP FEATURE

(71) Applicant: Dana Heavy Vehicle Systems Group, LLC, Maumee, OH (US)

(72) Inventors: Justin Hall, Ottawa Lake, MI (US); Mark W. Leber, Holland, OH (US); Shane T. Smith, Sylvania, OH (US); Michael D. Cook, Holland, OH (US); Nicholas Oen, Sylvania, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/459,902

(22) Filed: Sep. 1, 2023

(51) Int. Cl.
*F16H 63/32* (2006.01)
*F16H 57/04* (2010.01)

(52) U.S. Cl.
CPC ......... *F16H 63/32* (2013.01); *F16H 57/0432* (2013.01); *F16H 57/0468* (2013.01); *F16H 57/0478* (2013.01)

(58) Field of Classification Search
CPC ... F16H 57/0432; F16H 63/32; F16H 57/0468
See application file for complete search history.

(56) References Cited

U.S. PATENT DOCUMENTS

| 3,587,783 | A | * | 6/1971 | Walters | F16H 63/32 |
| | | | | | 184/13.1 |
| 4,238,012 | A | * | 12/1980 | Takiguchi | F16D 23/06 |
| | | | | | 192/48.91 |
| 5,027,672 | A | * | 7/1991 | Salvatori | F16H 63/32 |
| | | | | | 192/82 R |
| 7,195,103 | B2 | | 3/2007 | Bathe et al. | |
| 8,522,638 | B2 | | 9/2013 | Aberg | |
| 8,776,631 | B2 | * | 7/2014 | Hada | F16H 63/32 |
| | | | | | 74/473.36 |
| 2009/0042685 | A1 | | 2/2009 | Ohmori et al. | |
| 2012/0011955 | A1 | | 1/2012 | Hada et al. | |

FOREIGN PATENT DOCUMENTS

| CN | 106286822 A | 1/2017 | |
| CN | 111795137 A | 10/2020 | |
| JP | 2009133375 A * | 6/2009 | ............. F16H 57/04 |

* cited by examiner

*Primary Examiner* — Thomas C Diaz
(74) *Attorney, Agent, or Firm* — McCoy Russell LLP

(57) ABSTRACT

A transmission shift fork comprising: an arch-shaped portion, where a pair of lobes are radially and inwardly projecting from an inner surface of the arch-shaped portion directing oil to a sleeve engagement region of a clutch.

15 Claims, 7 Drawing Sheets

SHIFT FORK LUBRICATION DRIP FEATURE

TECHNICAL FIELD

A shift fork for use in a transmission, designed to couple to a synchronizer, with an arch-shaped portion comprising a pair of legs with a pair of lobes. Each lobe extends in radial direction inward from an inner surface of the arch-shaped portion and a leg. Each of the lobes may direct fluid to a sleeve engagement that couples a sleeve of a synchronizer to the shift fork.

BACKGROUND AND SUMMARY

Vehicles, such as electrified vehicles, may have a transmission to switch gears of different ratios that produce different output torques and rotational speeds with the same input torque. The transmission may include clutch assemblies, such as synchronizers. Each synchronizer may be used as a clutch to shift gears. The clutch assemblies may be actuated to selectively couple complementary gears via at least an actuator and a shifting rod. Each of the clutch assemblies may be physically coupled to a shift fork. The shift fork may shiftingly couple a complementary clutch assembly to the shifting rod, such that actuation of the shifting rod may translate the shift fork and components of the clutch assembly in approximately the same direction the shifting rod is actuated. As synchronizers, each of the clutch assemblies may comprise a sleeve and a hub. Each of the clutch assemblies may be physically coupled to a complementary shift fork via a plurality of sleeve engagements, such as pads.

An electric vehicle may transfer rotational energy to a transmission via torque at higher rotational speeds than an internal combustion engine (ICE). At higher speeds and/or the use of a larger synchronizer for high torques, the surface speed of a sleeve relative to the shift fork may be increased during selectively coupling of the synchronizer. The increased relative speeds of the sleeve may generate increased friction and thermal energy between the sleeve engagements and the areas of contact with the sleeve. As each of the synchronizers actuate and selectively couple a complementary gear, friction and heat may build up at the sleeve engagements and groove. The increased friction and heat, may result in acute or chronic degradation to the sleeve engagements, sleeve, or other components of the synchronizer and shift fork. To decrease the force of friction and heat, lubrication via a lubricant, such as oil, may be increased and directed to the area of contact between the sleeve engagements and sleeves. For one example, splash lubrication may be used for lubrication, splashing lubricant from a complementary gear to the synchronizer. However, at high rotational speeds lubricant splashed on the sliding sleeve is flung off by the rotation of the sleeve before reaching the pads. For another example, a sprayer may be used to apply lubricant via targeted spraying to the each of the sleeve engagement. However, the use of a sprayer increases the complexity of the system, uses a pressure or another form of additional power to spray each of the sleeve engagements, and may pull additional lubricant away from the sump or other regions of the transmission that may be used for other purposes. Likewise, transmission may not have the packing space enclosed by the transmission housing for sprayers.

The inventors herein have recognized these and other issues with such systems and have come up with a way to at least partially solve them. As developed in one example, a transmission shift fork comprising: an arch-shaped portion, where a pair of lobes are radially and inwardly projecting from an inner surface of the arch-shaped portion directing oil to a sleeve engagement region of a clutch.

When the arch-shaped portion of the shift fork is splashed with lubricant from a complementary gear to the synchronizer or another clutch assembly, the lubricant may coat and be pulled passively toward the lobes. The lubricant may then coat and accumulate on the lobes. The curvature of the lobes may direct lubricant to drip onto the sleeve engagements and between the contact surface of the sleeve and sleeve engagement. The lubricant may drip onto the sleeve engagements and the contact surface, such that the lubricant may lubricate the sleeve engagements, reducing friction and thermal energy between the sleeve engagements and sleeve. After lubricating and absorbing thermal energy, the lubricant may be flung off or drip from the sleeve.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a shift fork that may be coupled to a sleeve of a synchronizer and direct lubricant to a plurality of sleeve engagements that may couple the synchronizer to the shift fork. The sleeve engagements may be in surface sharing contact with the sleeve of the synchronizer and fastened to the shift fork, such that the shift fork may be physically coupled to a sleeve of a synchronizer. The shift fork may be used in a transmission of a vehicle, such as an electrified vehicle, such as an all-electric vehicle (EV) or a hybrid vehicle with multiple inputs of torque. The shift fork may be shiftingly coupled to a shifting rod, such that the shift fork may be translated approximately a direction parallel to the direction the shifting rod is actuated. The shifting rod may be shifted by an actuator. The shift fork may be shiftingly coupled to a shifting rod actuated by the actuator. As the shift fork is actuated, components of the synchronizer, such as the sleeve and a plurality of rings of the synchronizer, may be actuated to slide with the friction fork.

The fork may comprise a plurality of arms, such as at least two arms. Each of the sleeve engagements may be fastened to an arm of the arms of the shift fork. The sleeve may rotate and spin about a longitudinal axis and a hub. The sleeve may rotate when physically coupled to the shift fork via the sleeve engagement.

When shifted by the actuator in a first direction or a second direction opposite to the first direction, the shifting rod and shift fork may engage or disengage the synchronizer from a gear. The gear complementary to the synchronizer may be a referred to as a target gear. The target gear may splash lubricant, such as oil, onto the surface of an arch or arch-shaped component of the shift fork. The surface may direct lubricant to the arms of the shift fork and a plurality of lobes physically coupled to or comprised of the arms. The lobes may be structures, such as fins, radially and inwardly projecting from the inner surfaces of the arms in the direction of the sleeve and curve about the sleeve from the arch. The each of the lobes may curve into tips. Each of the tips may be positioned above a sleeve engagement of the sleeve engagements. Lubricant that coats or accumulates on surfaces of the lobes may be directed toward and accumulate on the tips, before dripping from each tip onto the sleeve engagement complementary to the tip. Lubricant may also be deposited on features of the sleeve above and near the sleeve engagements. Lubricant coating the sleeve engagements may drip from the sleeve engagements to another component the transmission comprises or houses, such as a sump. Likewise, lubricant coating the sleeve engagement may be transferred to a surface of the sleeve and then drip or be flung to another component the transmission comprises or houses, such as the sump.

Figure 1:
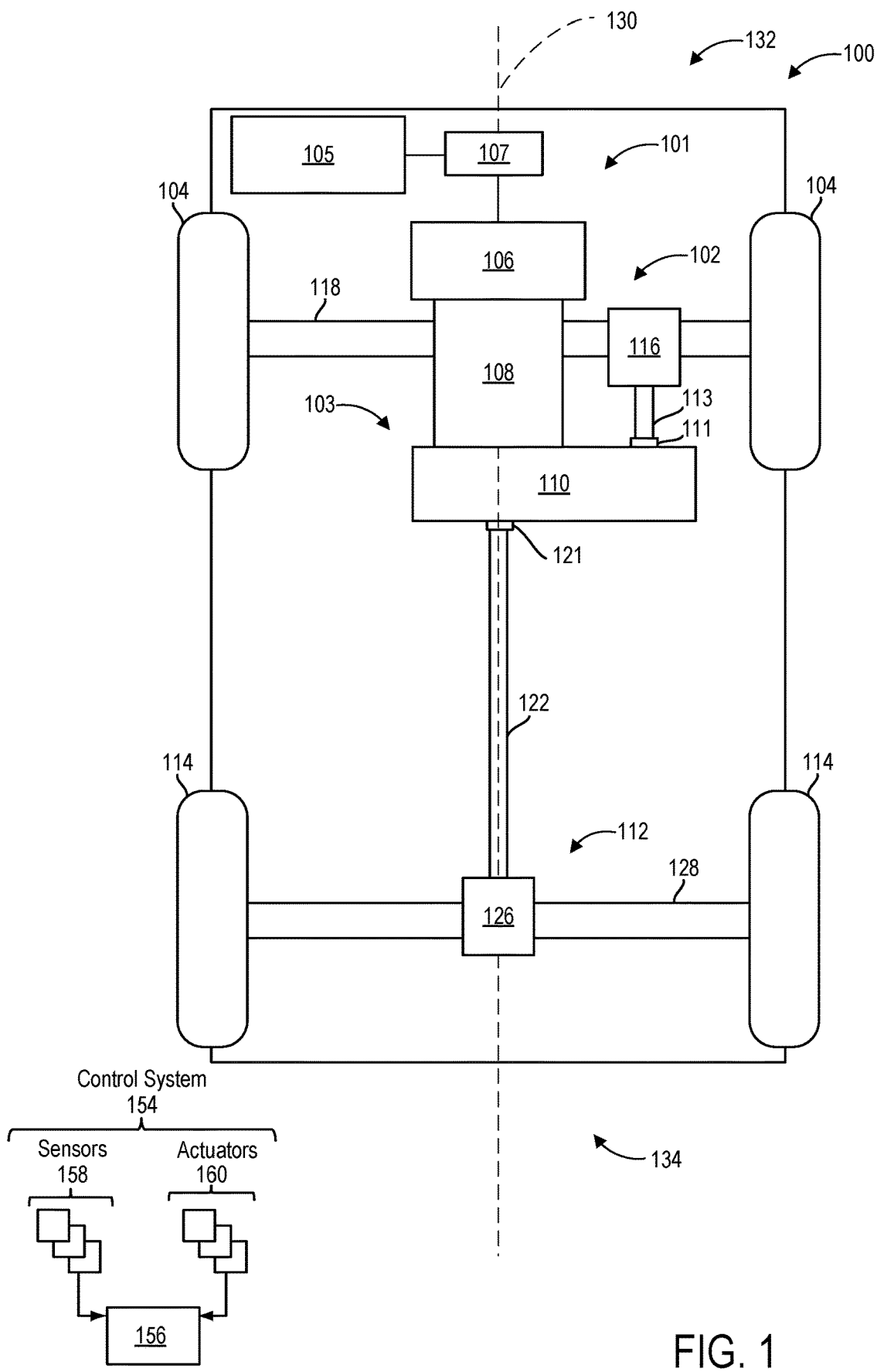
FIG. 1 shows an example schematic of a vehicle which may include the transmission of the present disclosure.
Figure 2:
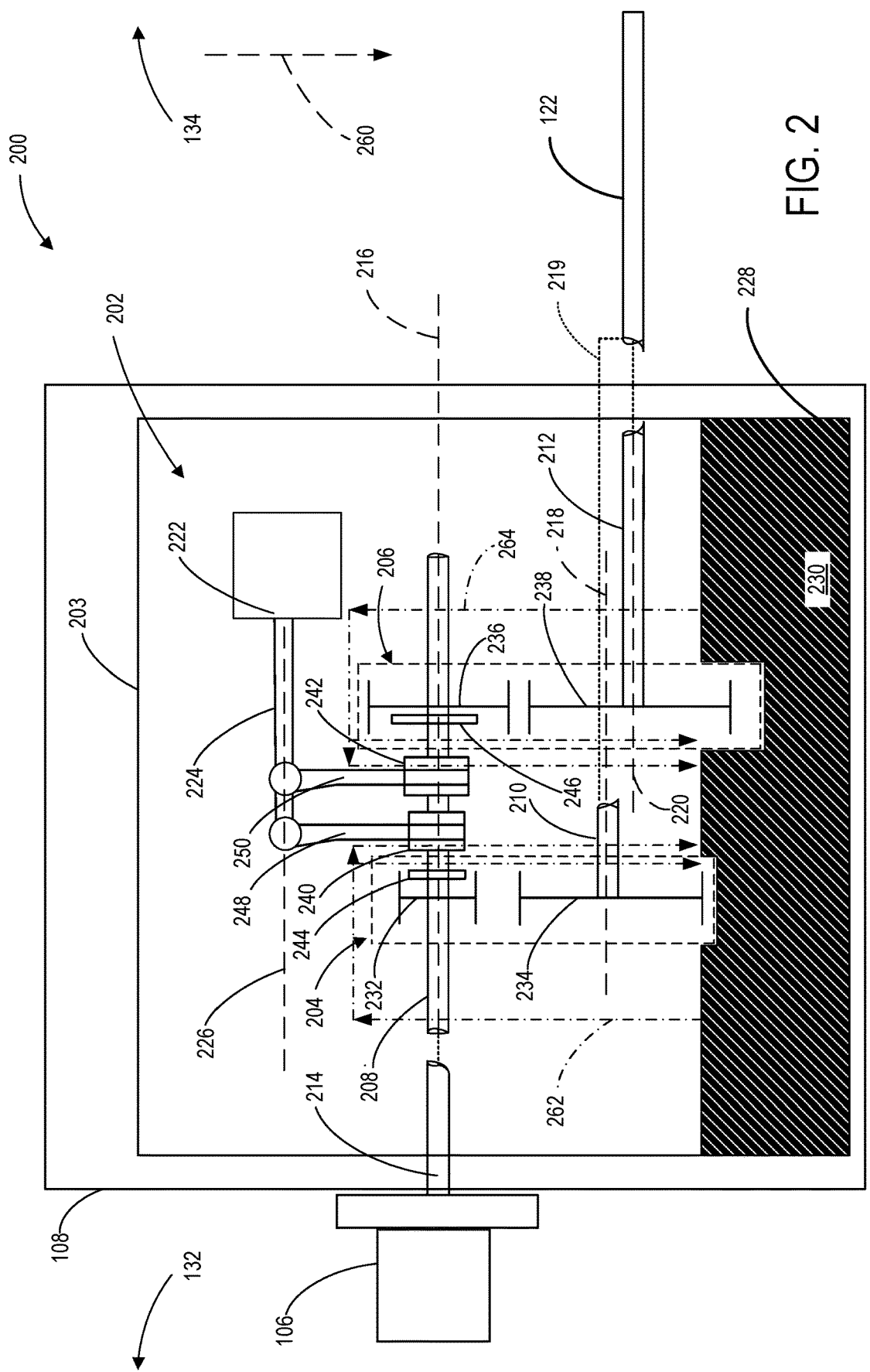
FIG. 2 shows an example schematic of a gear assembly of the transmission which may include synchronizers and shift forks of the present disclosure.
Figure 3:
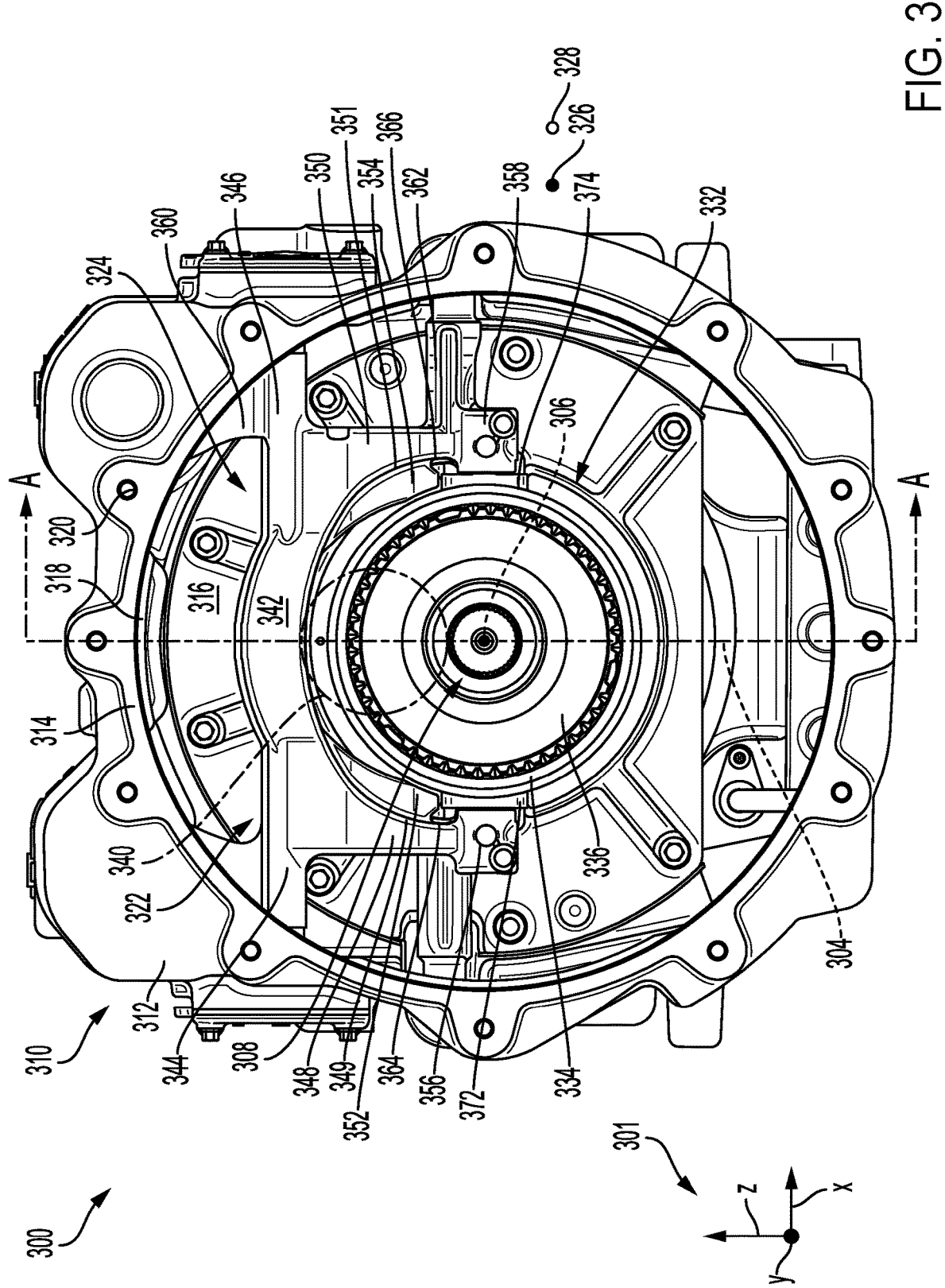
FIG. 3 shows a first view of an assembly of synchronizers and a shift fork of the present disclosure.
Figure 4A:
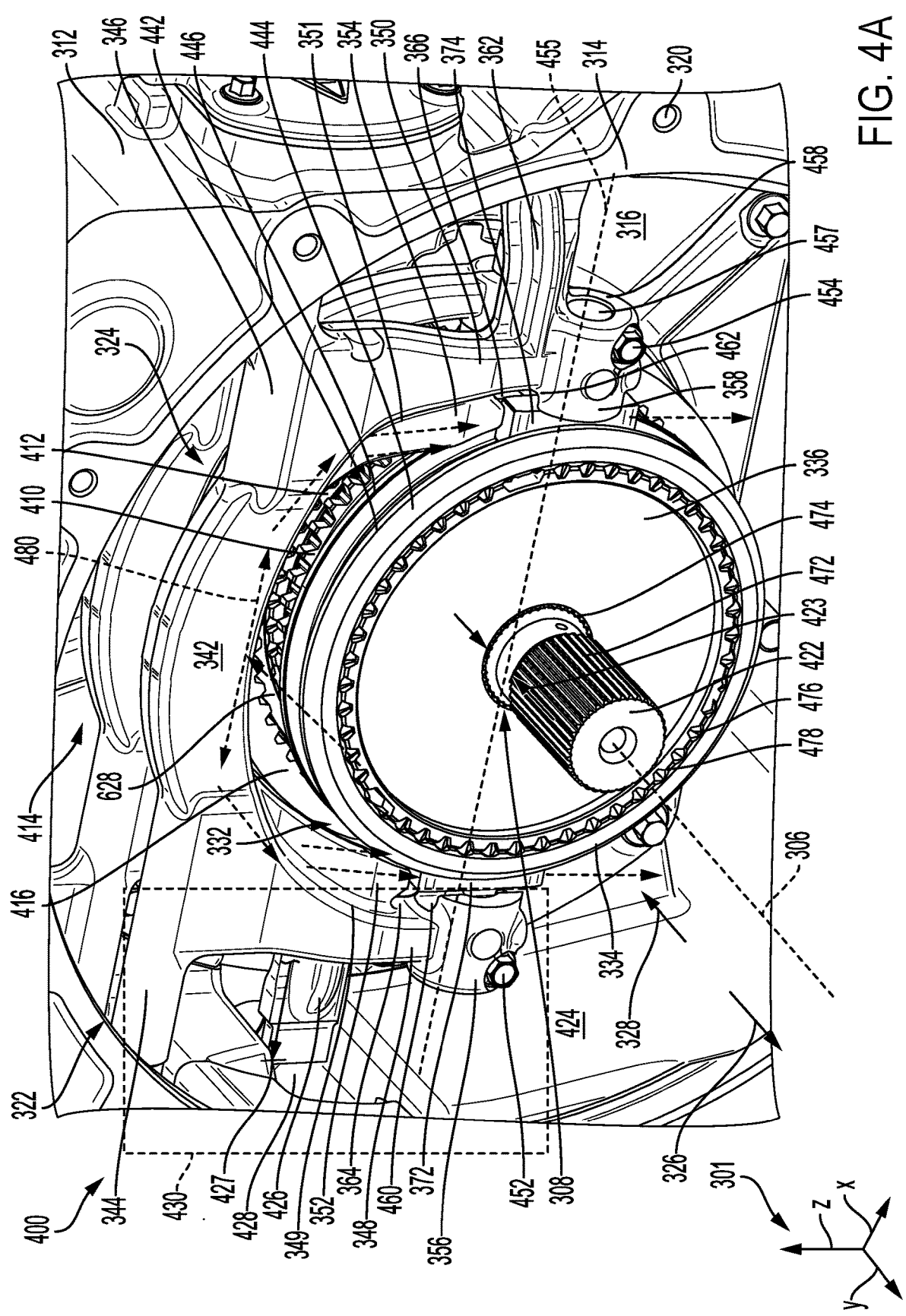
FIG. 4A shows a second view of the assembly of synchronizers and a shift fork of FIG. 3.
Figure 4B:
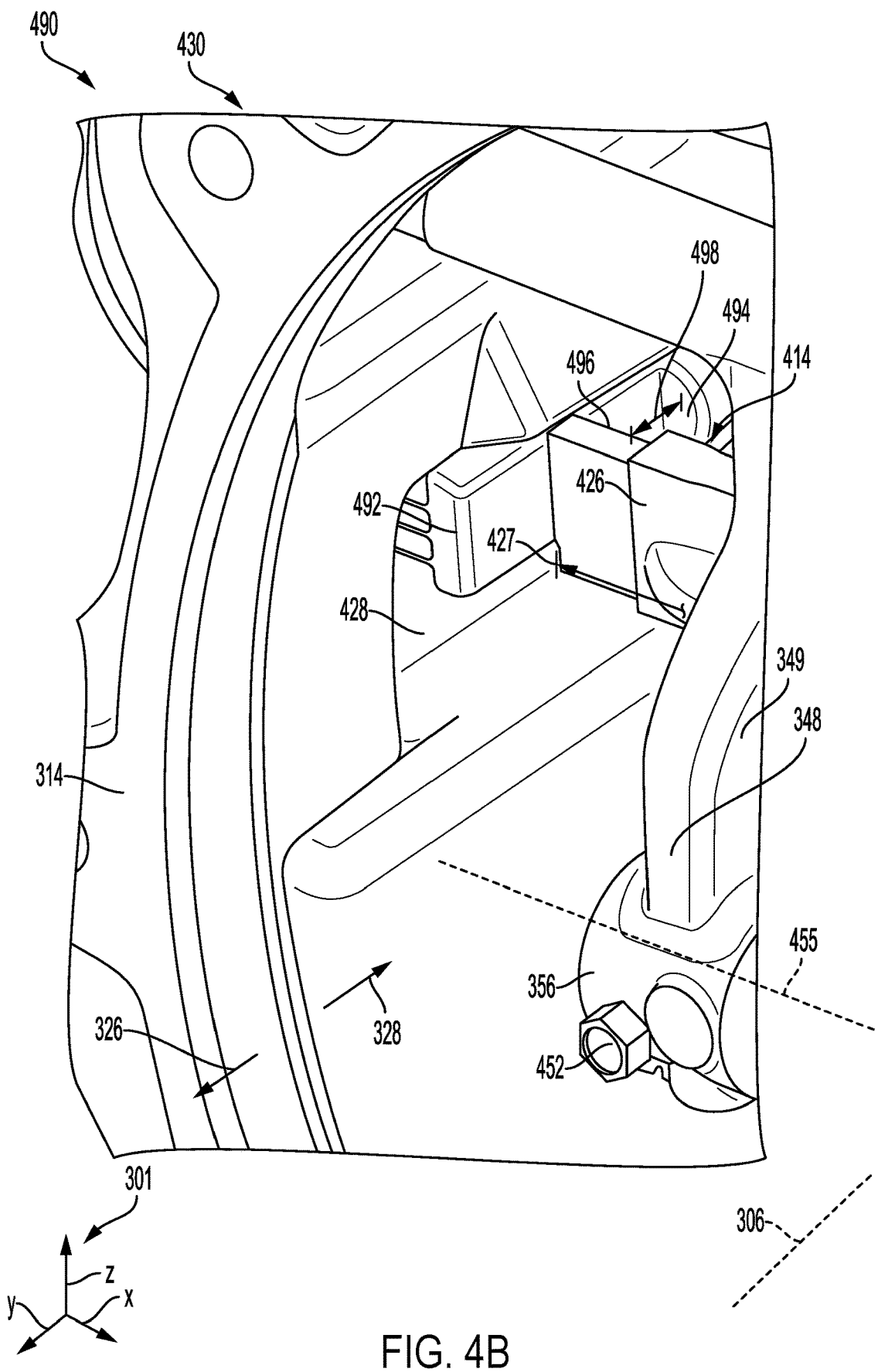
FIG. 4B shows a view of the assembly from a region taken from FIG. 4A.
Figure 5:
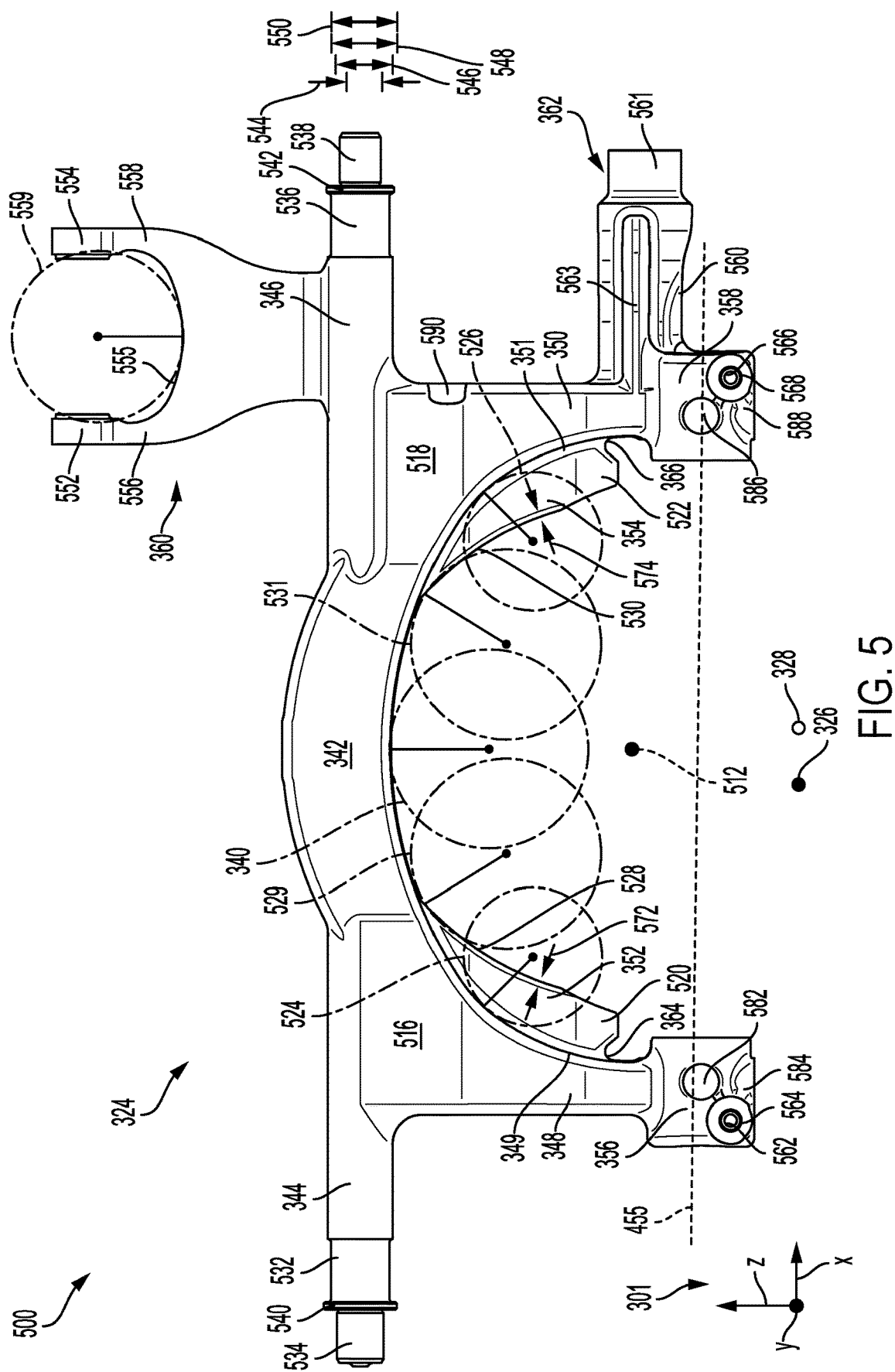
FIG. 5 shows a third view of the shift fork of the present disclosure isolated from the assembly of FIGS. 3-4A.
Figure 6:
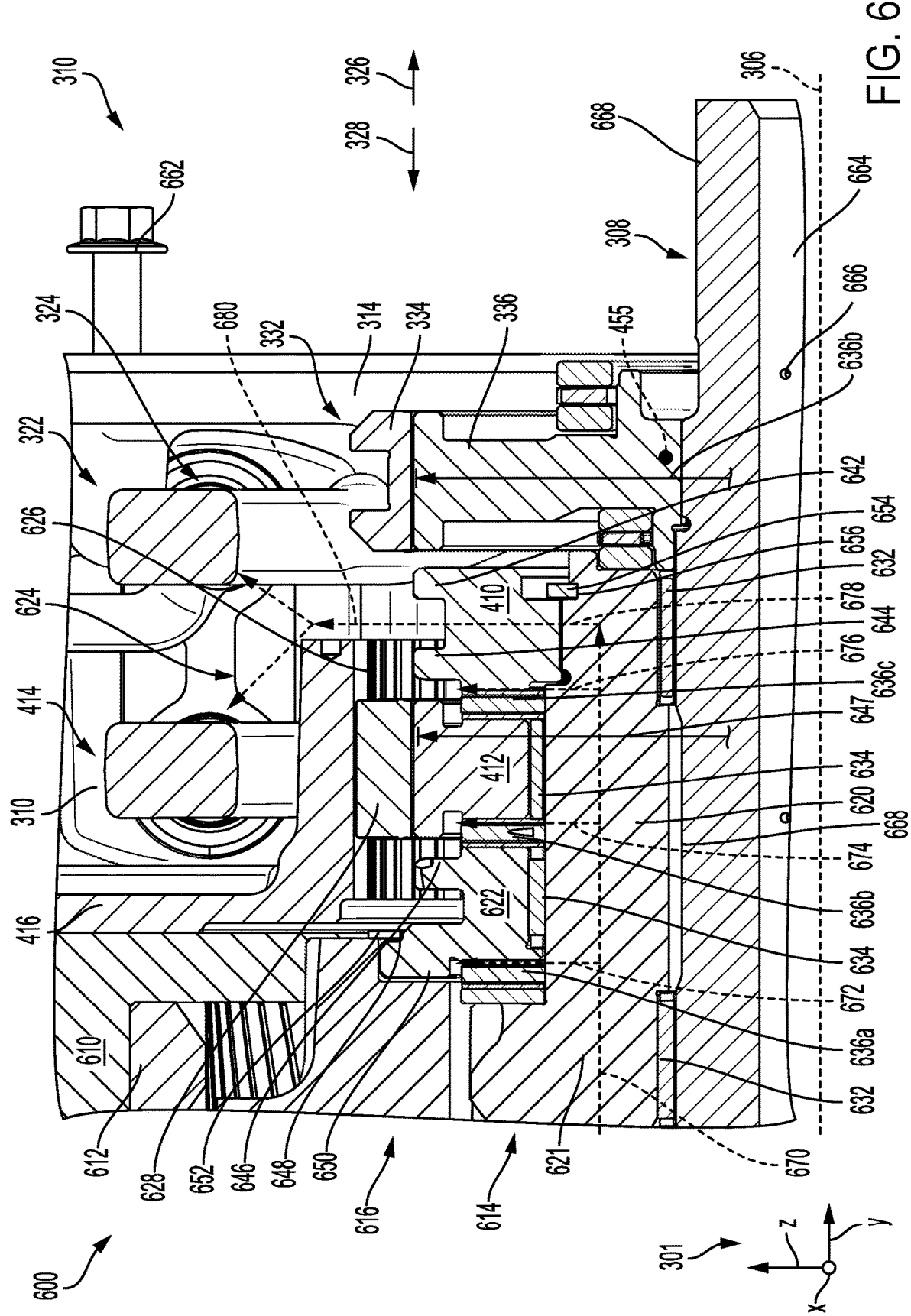
FIG. 6 shows a fourth view that is a sectioned view of the assembly and a plurality of target gears.

FIG. 1 shows an example schematic of a vehicle which may include the transmission of the present disclosure. The vehicle in FIG. 1 may be an electrified vehicle such as a EV or a hybrid vehicle with multiple sources of torque that may include an electric motor, a hydrogen fuel cell, and/or a non-internal combustion (ICE) engine. FIG. 2 shows an example schematic of a gear assembly of the transmission which may include synchronizers and shift forks of the present disclosure. FIG. 3 shows a first view of an assembly of synchronizers and a shift fork of the present disclosure. The assembly of FIG. 3 includes a housing about a shifting assembly, wherein the shifting assembly may comprise synchronizers, shift forks, and rotational elements complementary to the synchronizers such as a shaft. The first view of FIG. 3 is a side view of the assembly showing the synchronizers and shift fork positioned about a shaft and longitudinal axis that are normal to the first view. FIG. 4A shows a second view of the assembly of synchronizers and a shift fork of FIG. 3. FIG. 4A shows additional features such as inner surfaces, recesses, and holes of the housing and features of the shifting assembly, such as the sleeves and the shift forks. FIG. 4B shows a view of the assembly from a region taken from FIG. 4A. The region of FIG. 4B shows a position sensor that may be used with a target of a shifting fork. FIG. 5 shows a third view of the shift fork of the present disclosure isolated from the assembly of FIGS. 3-4. The shift fork in FIG. 5 is not fastened to components such as the sleeve engagements. The third view of FIG. 5 shows additional features of an offset arm that may be used to fasten and shiftingly couple the shift fork to a shifting rod. FIG. 6 shows a fourth view that is a sectioned view of the assembly and a plurality of target gears. FIG. 6 shows an additional gear collars and how gear collars may be drivingly coupled to their complementary gears.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced.

FIGS. 1-2 shows schematics of an example configuration with relative positioning of the various components. FIGS. 3-6 show example configurations with approximate position. FIGS. 3-6 are shown approximately to scale; though other relative dimensions may be used. As used herein, the terms "approximately" is construed to mean plus or minus five percent of the range unless otherwise specified.

Further, FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Features described as axial may be approximately parallel with an axis referenced unless otherwise specified. Features described as counter-axial may be approximately perpendicular to the axis referenced unless otherwise specified. Features described as radial may circumferentially surround or extend outward from an axis, such as the axis referenced, or a component or feature described prior as being radial to a referenced axis, unless otherwise specified.

Features described as longitudinal may be approximately parallel with an axis that is longitudinal. A lateral axis may be normal to the longitudinal axis. Features described as lateral may be approximately parallel with the lateral axis and normal to the longitudinal axis.

Turning now to FIG. 1, a vehicle 100 is shown comprising a powertrain 101 and a drivetrain 103. The vehicle 100 may have a front end 132 and a rear end 134, located on opposite sides of vehicle 100. Objects, components, and features of the vehicle 100 referred to as being located near the front may be closest to the front end 132 compared to the rear end 134. Objects, components, and features of the vehicle 100 referred to as being located near the rear may be closest to the rear end 134 compared to the front end 132. The powertrain 101 comprises a prime mover 106 and a transmission 108. The prime mover 106 may be an internal combustion engine (ICE) or an electric motor, for example, and is operated to provide rotary power to the transmission 108. The transmission 108 may be any type of transmission, such as a manual transmission, an automatic transmission, or a continuously variable transmission. The transmission 108 receives the rotary power produced by the prime mover 106 as an input and outputs rotary power to the drivetrain 103 in accordance with a selected gear or setting. Additionally, there may be other movers in the vehicle besides prime mover 106. If the prime mover 106 is an ICE there may be at least a second mover with an input to the transmission 108, wherein the second mover may be an electric machine such as an electric motor. In one example, if there are a single or plurality of second movers in addition to the prime mover 106, the vehicle 100 may be a hybrid vehicle, wherein there are multiple torque inputs to the transmission 108. The vehicle 100 may have a longitudinal axis 130. The powertrain 101 and drivetrain 103 may have a length parallel with the longitudinal axis 130.

The prime mover 106 may be powered via energy from an energy storage device 105. In one example, the energy storage device 105 is a battery configured to store electrical energy. An inverter 107 may be arranged between the energy storage device 105 and the prime mover 106 and configured to adjust direct current (DC) to alternating current (AC). The inverter 107 may include a variety of components and circuitry with thermal demands that effect an efficiency of the inverter.

The vehicle 100 may be a commercial vehicle, light, medium, or heavy duty vehicle, a passenger vehicle, an off-highway vehicle, and/or sport utility vehicle. Additionally or alternatively, the vehicle 100 and/or one or more of its components may be in industrial, locomotive, military, agricultural, and/or aerospace applications. In one example, the vehicle 100 is an all-electric vehicle or a vehicle with all-electric modes of operation, such as a plug-in hybrid vehicle. As such, the prime mover 106 is an electric machine. In one example, the prime mover 106 is an electric motor/generator.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The drivetrain 103 is shown in a four-wheel drive configuration, although other configurations are possible. For example, the drivetrain 103 may include a rear-wheel drive or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing. The first driveshaft 113 and second driveshaft 122 may be positioned to extend in parallel with the longitudinal axis 130. For an example of a configuration of vehicle 100, the second driveshaft 122 may be centered about the longitudinal axis 130.

The first differential 116 may supply a FWD in some capacity to vehicle 100, as part of rotary power transferred via the first driveshaft 113. Likewise, the second differential 126 may supply a RWD to vehicle 100, as part of the rotary power transferred via the second driveshaft 122. The first differential 116 and the second differential 126 may supply a FWD and RWD, respectively, as part of an AWD mode for vehicle 100.

Adjustment of the drivetrain 103 between the various modes as well as control of operations within each mode may be executed based on a vehicle control system 154, including a controller 156. Controller 156 may be a microcomputer, including elements such as a microprocessor unit, input/output ports, an electronic storage medium for executable programs and calibration values, e.g., a read-only memory chip, random access memory, keep alive memory, and a data bus. The storage medium can be programmed with computer readable data representing instructions executable by a processor for performing the methods described below as well as other variants that are anticipated but not specifically listed. In one example, controller 156 may be a powertrain control module (PCM).

Controller 156 may receive various signals from sensors 158 coupled to various regions of vehicle 100. For example, the sensors 158 may include sensors at the prime mover 106 or another mover to measure mover speed and mover temperature, a pedal position sensor to detect a depression of an operator-actuated pedal, such as an accelerator pedal or a brake pedal, speed sensors at the first and second set of wheels 104,114, etc. Vehicle acceleration is directly proportional to accelerator pedal position, for example, degree of depression. Upon receiving the signals from the various sensors 158 of FIG. 1, controller 156 processes the received signals, and employs various actuators 160 of vehicle 100 to adjust drive train operations based on the received signals and instructions stored on the memory of controller 156. For example, controller 156 may receive an indication of depression of the brake pedal, signaling a desire for decreased vehicle speed. In response, the controller 156 may command operations, such as shifting gear modes of the transmission 108. Alternatively, the gear modes of the transmission 108 may be shifted manually, such as if the transmission 108 is a manual transmission.

In some examples, additionally or alternatively, the vehicle 100 may be a hybrid vehicle including both an engine an electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

In some embodiments, additionally or alternatively, the transmission 108 may be a first transmission, further comprising a second transmission arranged on the second set of axle shafts 128. Herein, the transmission 108 may be interchangeably referred to as a gearbox.

Turning to FIG. 2, a schematic 200 of the transmission 108 and gear enclosure 203 illustrated with reference to FIG. 1 is shown. The gear enclosure 203 may be enclosed by and be comprised of the housing of the transmission 108. In one example, the gear enclosure 203 contains a gear assembly 202. The gearbox (e.g., the transmission 108) may be a multi-stage reduction gearbox with the gear assembly 202 acting as a system of a plurality of reduction sets. The gear assembly 202 may be formed of at least two reduction sets that may reduce the rotational speed (e.g., rotation per minute (RPM)) and increase the torque. The reduction sets may be referred to herein as stages. The stages may be gearsets. There may be a first stage 204 and second stage 206. The first stage 204 and second stage 206 may comprise gears, such as fixed gears.

As an example, the enclosure 203 of the transmission 108 may contain a first shaft 208, a second shaft 210, and a third shaft 212. The first stage 204 may be supported by the first shaft 208 and the second shaft 210. The second stage 206 may be supported by the first shaft 208 and the third shaft 212. The first shaft 208 may act as an input to the first stage 204 and second stage 206. The second shaft 210 may act as an output for the first stage 204. The third shaft 212 may act as an output for the second stage 206. The first stage 204 may drivingly couple the first shaft 208 to the second shaft 210. The second stage 206 may drivingly couple first shaft 208 to the third shaft 212. The first shaft 208 may be centered on a first axis 216. The second shaft 210 may be centered on a second axis 218. The third shaft 212 may be centered on a third axis 220. The first axis 216, second axis 218, and third axis 220 may be parallel with one another. The first stage 204 may traverse the first axis 216 to the second axis 218. The second stage 206 may traverse the first axis 216 to the third axis 220. The first shaft 208 may drivingly couple a first input shaft to gear assembly 202. For the example shown in schematic 200, the first input shaft may be an output shaft 214 of the prime mover 106. The output shaft 214 may be referred to herein as the prime mover output shaft 214. For this example, the prime mover 106 may be a first electric machine, such as a first electric motor. Shafts and other components that may be drivingly coupled but not directly contacting may be represented by dotted lines 219.

However, other configurations of the gearbox are possible. For example, the first input shaft may be a shaft drivingly coupled to output shaft 214 or the output of another reduction set. Additionally, for other configurations, there may be only a single shaft, such as second shaft 210, that may be selectively and drivingly coupled to the first shaft 208 via reduction ratios. For example, the first stage 204 and second stage 206 may selectively and drivingly couple the first shaft 208 to the second shaft 210.

The second shaft 210 and third shaft 212 may be drivingly coupled to a first output shaft. For the example shown in schematic 200, the first output shaft may be a drive shaft, such as the second driveshaft 122. However, other configurations of the gear assembly 202 and enclosure 203 are possible. For example, the first output shaft may be a shaft drivingly coupled to a drive shaft, such as the second driveshaft 122, or to another reduction set. Additionally, for other examples, the second shaft 210 and/or third shaft 212 may be drivingly coupled to separate outputs shafts. For example, the second shaft 210 may be drivingly coupled a first output shaft, such as the first driveshaft 113 of FIG. 3. For this example, the third shaft 212 may be drivingly coupled to a second output shaft, such as the second driveshaft 122. Additionally, for other examples, the second shaft 210 and/or third shaft 212 may be output shafts.

An actuator 222 may be used to selectively and drivingly couple the first stage 204 or second stage 206 to the first shaft 208. The actuator 222 may be drivingly coupled to a shifting rod 224. The actuator 222 may be mounted to the transmission 108 or a component of the transmission 108, such as the walls and surfaces of the enclosure 203. For one example, the actuator may be mounted via fastening by a plurality of fasteners, such as screws. For another example, the actuator may be fit to a recess or void of surfaces and material of the transmission 108. The actuator 222 may be one of the actuators 160 of FIG. 1.

The actuator 222 may translate the shifting rod 224 along a fourth axis 226. When translated in a first direction, such as toward the front end 132, the shifting rod 224 may drivingly couple the first stage 204 to the first shaft 208. When translated in a second direction, such as toward the rear end 134, the shifting rod 224 may drivingly couple the second stage 206 to the first shaft 208. The shifting rod 224 may be guided by the housing of the transmission 108 and/or enclosure 203. For an example, the actuator 222 may be a shift lever.

The enclosure 203 may form a sump 228 for work fluid 230. The work fluid 230 may be a lubricant, such as oil. The gears of the first stage 204 and second stage 206 may be lubricated by the work fluid 230 via splashing. The sump 228 may be located below the assembly 202, such that work fluid 230 may be returned to the sump 228 via the force of gravity 260 and lowest gear of the first stage 204 and second stage 206 may dip into sump 228. Dipping of a gear into the sump 228 may coat the teeth and other components with work fluid 230. When coated with work fluid 230, a gear of the first stage 204 and a gear in second stage 206 may carry and coat the teeth of other gears in mesh, therein lubricating the other gears of the first stage 204 and second stage 206. The splashing of lubricant from the gears may coat other components of the assembly 202, such as portions of the first shaft 208, second shaft 210, and third shaft 212. After lubricating the gears of the first stage 204 and second stage 206, work fluid 230 may be returned to the sump 228 via splashing and dripping.

The first stage 204 and second stage 206 may be formed of a plurality of gears. Both the first stage 204 and second stage 206 may each be formed from at least two gears. For an example, the first stage 204 may be formed of a first gear 232 and a second gear 234. For this example, the second stage 206 may be formed of a third gear 236 and a fourth gear 238.

There may be a plurality of arms and engagements used by the shifting rod 224 and actuator 222 to drivingly couple reduction sets. There may be at least one arm and two engagements drivingly coupled to the shifting rod 224 to select reduction sets. The number of arms and engagements drivingly coupled to the shifting rod 224 may be dependent on the number of sets to engage. The first stage 204 may be drivingly coupled to the first shaft 208 via a first engagement 240 and first coupling 244. Likewise, the second stage 206 may be drivingly coupled to the first shaft 208 via a second engagement 242 and second coupling 246. The first engagement 240 and second engagement 242 may be drivingly coupled to the shifting rod 224 via a first arm 248 and second arm 250, respectively.

The first coupling 244 and second coupling 246 may be drivingly coupled to the first gear 232 and second gear 234, respectively. The first engagement 240 and first coupling 244 may form a clutch, such as a synchronizer clutch. The second engagement 242 and second coupling 246 may form a clutch, such as a synchronizer clutch. The first engagement 240 and second engagement 242 may each be synchronizers.

Schematic 200 shows a first path 262 the work fluid 230 may take from the sump 228 when transported by the first stage 204. Likewise, schematic 200 shows a second path 264 the work fluid 230 may take from the sump 228 when transported by the second stage 206.

The first path 262 may begin at the sump 228 when the second gear 234 dips into the work fluid 230. Work fluid 230 may coat the teeth and surfaces of the second gear 234. Some of the work fluid 230 coating the second gear 234 may return to the sump 228 via splashing or dripping. Some of the work fluid 230 may also be splashed to coat and adhere to components coupled to or near the second gear 234, such as the second shaft 210. Some of the work fluid 230 may adhere and accumulate between features of the second gear 234, such as teeth. As the second gear 234 rotates, the teeth of the first gear 232 may interlock with the second gear 234. Work fluid 230 may be transferred from the teeth of the second gear 234 to the teeth and other features of the first gear 232 via splashing and adhesion. Work fluid 230 may be returned to the sump 228 or to the second gear 234, from the first gear 232 via dripping and splashing. Work fluid 230 may also be splashed from the first gear 232 to other features and components coupled to or in close proximity to the first gear 232, such as the first shaft 208 and the first coupling 244. For this example, the first path 262 may splash work fluid onto the first arm 248. Upon coating the first arm 248, work fluid 230 may drip to coat and lubricate the first engagement 240. Work fluid 230 may drip from the first engagement 240 and first arm 248 to the sump 228 or other components of the assembly 202. Adhesive forces, rotational forces, and splashing may carry work fluid 230 on first path 262 in upward against the force of gravity 260. The force of gravity 260 may also pull work fluid 230 to drip from components of the first stage 204 to the sump 228 and other components of the assembly 202.

The second path 264 may begin at the sump 228 when the fourth gear 238 dips into the work fluid 230. Work fluid 230 may coat the teeth and surfaces of the fourth gear 238. Some of the work fluid 230 coating the fourth gear 238 may return to the sump 228 via splashing or dripping. Some of the work fluid 230 may also be splashed to coat and adhere to components coupled to or near the fourth gear 238, such as the third shaft 212. Some of the work fluid 230 may adhere and accumulate between features of the fourth gear 238, such as teeth. As the fourth gear 238 rotates, the teeth of the third gear 236 may interlock with the fourth gear 238. Work fluid 230 may be transferred from the teeth of the fourth gear 238 to the teeth and other features of the third gear 236 via splashing and adhesion. Work fluid 230 may be returned to the sump 228 or to the fourth gear 238, from the third gear 236 via dripping and splashing. Work fluid 230 may also be splashed from the third gear 236 to other features and components coupled to or in close proximity to the third gear 236, such as the first shaft 208 and the second coupling 246. For this example, the second path 264 may splash work fluid onto the second arm 250. Upon coating the second arm 250, work fluid 230 may drip to coat and lubricate the second engagement 242. Work fluid 230 may drip from the second engagement 242 and second arm 250 to the sump 228 or other components of the assembly 202. Adhesive forces, rotational forces, and splashing may carry work fluid 230 on the second path 264 in upward against the force of gravity 260. The force of gravity 260 may also pull work fluid 230 to drip from components of second stage 206 to the sump 228 and other components of the assembly 202.

Schematic 200 shows a single shifting rod, shifting rod 224, that may be shifted by the actuator 222. The shifting rod 224 may physical couple to and actuate the first arm 248 and the second arm 250. However, it is to be appreciated that the schematic 200 is non-limiting and there may be a plurality of shifting rods and actuators. For example, there may be a plurality of shifting rods shifted by actuator 222. For another example, there may be a plurality of shifting rods wherein each shifting rod is shifted by an actuator specifically coupled to each shifting rod. For these examples, each shifting rod may be specific to an arm, such as the first or second arm 248, 250, that may be used to actuate engagements, such as the first or second engagement 240, 242.

A set of reference axes 301 are provided for comparison between views shown in FIG. 3-6. The reference axes 301 indicate a y-axis, an x-axis, and a z-axis. In one example, the z-axis may be parallel with a direction of gravity and the x-y plane may be parallel with a horizontal plane that an assembly 310 may rest upon. When referencing direction, positive may refer to in the direction of the arrow of the y-axis, x-axis, and z-axis and negative may refer to in the opposite direction of the arrow of the y-axis, x-axis, and z-axis. A filled circle may represent an arrow and axis facing toward, or positive to, a view. An unfilled circle may represent an arrow and an axis facing away, or negative to, a view.

Turning to FIG. 3, it shows a first view 300 of the assembly 310 positioned about a longitudinal axis 306. The assembly 310 may be divided by a line 304 that is perpendicular to the longitudinal axis 306. For this example, line 304 may vertical and may be used to take a sectional view of the assembly 310 herein. The assembly 310 may be comprised of a housing 312 and a shifting assembly 322 about a shaft 308. The shaft 308 may be centered about the longitudinal axis 306, such that a centerline of the shaft 308 may be approximately collinear with the longitudinal axis 306. The shaft 308 may support gears and may selectively couple to gears via the shifting assembly 322. View 300 may be normal to the longitudinal axis 306 and the y-axis of the reference axes 301. As shown in the first view 300, the longitudinal axis 306 is represented by a filled circle.

The housing 312 may be located about and partially enclose the shifting assembly 322. The shifting assembly 322 may be partially housed and visible in FIG. 3 from a hole 318. The hole 318 and a flange 314 about the hole may be positioned in first direction 326 from the shifting assembly 322. A cover 316 of the housing 312 may be positioned in a second direction 328 from the shifting assembly 322. The second direction 328 is opposite the first direction 326. The first direction 326 and second direction 328 may be a first longitudinal direction and a second longitudinal direction, respectively, wherein the first direction 326 and second direction 328 are parallel with the longitudinal axis 306 and therein longitudinal in direction. In the first view 300, the first direction 326 is represented by a filled circle, representing a direction into the first view 300. Likewise, in the first view 300, the second direction 328 is represented by an unfilled circle, representing a direction out of the view 300.

The flange 314 may fasten the housing 312 against a transmission or a component of the transmission, such that the housing 312 may be stable and an output of the shaft 308 may be drivingly coupled to a rotational element of the transmission. The cover 316 may prevent lubricant from leaving the housing in the second direction 328. For an example embodiment, the flange 314 may be fastened to a complementary surface, component, or feature of the transmission via a plurality of fasteners and complementary holes 320. The complementary holes 320 may extend through the material of the flange 314 and housing 312 in a longitudinal direction with respect to longitudinal axis 306.

The shifting assembly 322 may comprise a single or plurality of forks and a single or plurality of synchronizers. For example, the shifting assembly 322 may comprise a first shift fork 324 and a first clutch assembly 332. The first shift fork 324 may be positioned outboard of the first clutch assembly 332. For an example of an embodiment, the first clutch assembly 332 may be a synchronizer. The first shift fork 324 may be a cast shift fork for a transmission, wherein the first shift fork 324 is a unitary and singular component created through casting. For an example, the first shift fork 324 and first clutch assembly 332 may be the first arm 248 and first engagement 240, respectively, of FIG. 2. For another example, the first shift fork 324 and first clutch assembly 332 may be second arm 250 and second engagement 242, respectively, of FIG. 2. The first clutch assembly 332 may be coupled to the first shift fork 324, such that the first clutch assembly 332 may be actuated with the first shift fork 324. Likewise, a shifting rod, such as shifting rod 224 of FIG. 2, may be coupled to the first shift fork 324, such that the shift fork 324 may be actuated in a longitudinal direction when the shifting rod slides in the longitudinal direction. The first clutch assembly 332 may selectively couple a gear of a gear assembly, referred to herein as a target gear. For example, a target gear may be the first gear 232 of FIG. 2. For another example, the target gear may be the third gear 236 of FIG. 2. When selectively coupled via the first clutch assembly 332, the target gear may be drivingly coupled to the shaft 308.

The first clutch assembly 332 may comprise a sleeve 334 and a hub 336. The sleeve 334 may be located about the hub 336. The hub 336 may be located about the shaft 308. The sleeve 334 may be coupled to the first shift fork 324, such that the sleeve 334 slide longitudinally with the first shift fork 324. The hub 336 may comprise or be rotationally coupled to a synchronizer ring and blocker ring, such as if the first clutch assembly 332 is a synchronizer.

For an example embodiment, the first shift fork 324 may be unitary and singular component, comprised of features and components that are continuous with one another via casting. Alternatively, some components, such as a plurality of lobes, may be joined to the shift fork 324. The shift fork 324 may comprise an arched-shaped portion or feature, such as the supportive arch 342. The supportive arch 342 may have a curvature of a first radius 340. The supportive arch 342 connects to or comprises a first arm 348 and a second arm 350. The supportive arch 342 connects to or comprises a first cantilever 344 and a second cantilever 346. The centerline of the first cantilever 344 and the centerline of the second cantilever 346 may be parallel and approximately collinear. The first arm 348 and second arm 350 curve at an angle from and are approximately continuous with the curvature of the supportive arch 342. The first cantilever 344 and second cantilever 346 may extend from the supportive arch 342 toward the inner surfaces of the housing 312. The first cantilever 344 has an end on the opposite to the end of the second cantilever 346. The first shift fork 324 may be positioned such that the centerlines of the first cantilever 344 and second cantilever 346 are perpendicular to the longitudinal axis 306.

The first arm 348 and second arm 350 may have a first inner surface 349 and a second inner surface 351, respectively. The first inner surface 349 and second inner surface 351 may curve about and face toward the longitudinal axis 306 as well as portions of the first clutch assembly 332 and the shaft 308. The first inner surface 349 and second inner surface 351 may have a plurality of cast projections that extend in a perpendicular direction from each of the surfaces. The first shift fork 324 may have at least a pair of cast projections that may be used for lubrication. For example, a first cast projection, referred to herein as a first lobe 352, may extend from the first inner surface 349 toward the longitudinal axis 306. For this example, a second cast projection, referred to herein as a second lobe 354, may extend from the second inner surface 351 toward the longitudinal axis 306. The first and second lobes 352, 354 may be curved, such that the first and second lobes 352, 354 may curve about the shaft 308. The first and second lobes 352, 354 are structures, such as fins, that may direct work fluid away from the first inner surface 349 and second inner surface 351, respectively. For an alternative embodiment the first and second lobes 352, 354 may be joined to the first arm 348 and second arm 350, respectively.

The first arm 348 may terminate at and comprise a first mounting component 356. The second arm 350 terminate at and comprise a second mounting component 358. The first and second mounting components 356, 358 may be partially cylindrical in shape. The first mounting component 356 may have necking and beveled surfaces continuous with the first arm 348. Likewise, the second mounting component 358 has necking and beveled surfaces continuous with the first arm 348 and a first target 362.

The first target 362 is a target for a position sensor, such that the position sensor may gauge the position of the first shift fork 324 along the axis 306. The first target 362 may be cast from or joined to the second arm 350. The first target 362 may extend from the second arm 350. An offset arm, may be cast from or joined to the second cantilever 346. The first target 362 may extend in a direction that is perpendicular to or radial with respect to the axis 306 when the first shift fork 324 is positioned about the axis 306. For example, in view 300, the first target 362 may extend in a lateral direction with respect to the axis 306. Likewise, an offset arm 360 may extend upward, in a vertical direction, from the second cantilever 346. Both the first target 362 and the offset arm 360 may extend toward the inner surfaces of the housing 312 from the shift fork 324. The offset arm 360 may physically couple and actuatingly couple the shift fork 324 to a shifting rod.

A first sleeve engagement 372 may be fastened to a first mounting component 356. Likewise, a second sleeve engagement 374 may be fastened to the second mounting component 358. The first and second sleeve engagements 372, 374 are engagement devices, such as a pad, for a synchronizer sleeve, such as sleeve 334. The first sleeve engagement 372 may be positioned between the first mounting component 356 and the sleeve 334, and have surface sharing contact with features of the sleeve 334. The second sleeve engagement 374 may be positioned between the second mounting component 358 and the sleeve 334, and have surface sharing contact with features of the sleeve 334. The surfaces of sleeve 334 in surface sharing contact with the first sleeve engagement 372 may comprise a first area of contact. The surfaces of sleeve 334 in surface sharing contact with the second sleeve engagement 374 may comprise a second area of contact. The sleeve engagement region may comprise the first area of contact and the second area of contact. When in surface sharing contact with the sleeve 334, the first and second sleeve engagements 372, 374 may couple the sleeve 334 to the first shift fork 324, such that the sleeve 334 may be actuated with the shift fork 324.

When the first sleeve engagement 372 is fastened to the first mounting component 356, the first notch 364 and portions of the first lobe 352 may be positioned above the first sleeve engagement 372. Likewise, when the second sleeve engagement 374 is fastened to the second mounting component 358, the second notch 366 and portions of the second lobe 354 may be positioned above the second sleeve engagement 374. The first notch 364 and portions of the first lobe 352 may direct lubricant, such as oil, toward the first sleeve engagement 372. Likewise, the second notch 366 and portions of the second lobe 354 may direct lubricant toward the second sleeve engagement 374.

The sleeve 334 may have a plurality of teeth complementary to the first hub 336. The first hub 336 may be coupled with the sleeve 334, such as to slide longitudinally with the sleeve 334. The sleeve 334 may be complementary to an engagement feature, such as a gear collar, of a target gear, such that the sleeve 334 may engaged and selectively couple to the engagement feature. The engagement feature may be drivingly coupled to the target gear, therein the sleeve 334 may selectively and rotationally couple to the target gear via the engagement feature. For example, the sleeve 334 may have teeth complementary to the teeth of the gear collar of the target gear. When the teeth of the sleeve 334 and teeth of the gear collar engage, the sleeve 334 may selectively and rotationally couple with the gear collar. By extension, the engagement of the sleeve 334 with the gear collar may selectively and rotationally couple the clutch assembly 332 to the target gear. The gear collar may be a coupling, such as the first coupling 244 or second coupling 246 of FIG. 2.

Turning to FIG. 4A, it shows a second view 400 of the assembly 310 positioned about a longitudinal axis 306. The second view 400 is a side view of the assembly 310 that shows no favoritism toward any axis of the reference axes 301.

The second view 400 shows an end 422 of the shaft 308. The end 422 may be an input or an output. The end 422 may support and drivingly couple to a rotational element, such as a gear, such as an input or output gear to the shifting assembly 322 and shaft 308. The end 422 may be rigidly connected to the shaft 308. A gap 423 shown in FIG. 3 between the end 422 and shaft 308 may be a transition region of the shaft 308. The transition region of the shaft 308 comprising the gap 423 may not be splined. Likewise, the second view 400 shows a first gear collar 410 and a second hub 412. The first gear collar 410 and second hub 412 may be positioned between the first shift fork 324 and a second shift fork 414. The first clutch assembly 332 may comprise and be engage with the first gear collar 410. The first gear collar 410 may have a plurality of teeth that may be complementary to and mesh with the sleeve 334. Likewise, a second clutch assembly, such as a second clutch assembly 624 of FIG. 6, may shiftingly coupled to the second shift fork 414. The second shift fork 414 may be positioned outboard of the second clutch assembly 624. The second clutch assembly may be a synchronizer. The second clutch assembly may comprise and be supported by a second hub 412. The second clutch assembly may also comprise a structure 416. A second sleeve, such as the second sleeve 628 of FIG. 6, may be slidingly coupled to and housed by the structure 416. When slidingly coupled, the second sleeve may slide when housed by the structure 416 while the structure remains stationary. The second sleeve may be shiftingly coupled to the second shift fork 414. The second hub 412 may have a plurality of splines and/or teeth complementary to the splines of the sleeve of the structure 416.

The second shift fork 414 may be a shift fork of approximately the same configuration as the first shift fork 324, wherein the second shift fork 414 may have approximately the same dimensions and features as the first shift fork 324. The second shift fork 414 may be positioned about the components such as the shaft 308 and components of the second clutch assembly, such as the second sleeve 628. The second shift fork 414 may be shiftingly coupled to a second sleeve housed within the structure 416. The second sleeve may have approximately the same dimensions as the first sleeve 334. The second shift fork 414, structure 416, and second sleeve may be positioned about the shaft 308 longitudinally between the first shift fork 324 and the cover 316. In second view 400, the first direction 326 and second direction 328 may be represented by arrows.

The second shift fork 414 may be mirrored and flipped compared to the first shift fork 324 with respect to the longitudinal axis 306. For example, the second shift fork 414 may have a second target 426 for a second position sensor. The second target 426 may be an appendage that extends from an arm of the second shift fork 414. The second target 426 may be positioned to have a length 427 perpendicular to the axis 306 and parallel with an axis 455, when the second shift fork 414 is positioned about the axis 306. The second target 426 may have approximately the same dimensions as the first target 362. The second target 426 may extend toward the opposite side of the housing 312 from the side of the housing 312 the first shift fork 324 may extend toward, with respect to the longitudinal axis 306. The second target 426 may extend toward and through an inner surface 424 of the housing 312. The housing 312 may have a second inner surface on the opposite side of the longitudinal axis 306 from the inner surface 424. Like the second target 426 with the inner surface 424, the first shift fork 324 may extend toward and through the inner surface of the housing 312 opposite to the inner surface 424.

The second target 426 may extend from the second shift fork 414 toward a first recess 428 of the housing 312. A region 430 may comprise the recess 428 and second target 426. The region 430 may also comprise portions of the inner surface 424 and other components of the first and second shift forks 324, 414. The region 430 may be enclosed by a plurality of dashed lines. The recess 428 may comprise and be depressed into the inner surface 424. The recess 428 may be positioned about portions of the second target 426. The second shift fork 414 may be mounted, such that the second target 426 may not rest upon and/or be in surface sharing contact with the walls of the recess 428. When shifted, the second shift fork 414 may move the second target 426 in a longitudinal direction within the walls of the recess 428.

The sleeve 334 has a groove 442. The groove 442 may be flanked by a first wall 444 and a second wall 446. The first wall 444 and the second wall 446 may be located radially, with respect to the longitudinal axis 306, and comprise the circumference of the sleeve 334. The groove 442 may depress through the material of sleeve 334. The groove 442 may depress in a radial direction with respect to the longitudinal axis 306 about the circumference of the sleeve 334. The first sleeve engagement 372 may be positioned in and partially enclosed by the groove 442, such as when the first sleeve engagement 372 is fastened to the first mounting component 356. The first sleeve engagement 372 may be flanked by and in surface sharing contact with the first wall 444 and second wall 446, such as when the first sleeve engagement 372 is fastened to the first mounting component 356. Likewise, the second sleeve engagement 374 may be positioned in and partially enclosed by the groove 442, such as when the second sleeve engagement 374 is fastened to the second mounting component 358. The second sleeve engagement 374 may be flanked by and in surface sharing contact with the first wall 444 and second wall 446, such as when the second sleeve engagement 374 is fastened to the second mounting component 358. The first sleeve engagement 372 and second sleeve engagement 374 may be in surface sharing contact with surfaces of groove 442. When the first and second sleeve engagements 372, 374 are inserted to the groove 442 and fastened to the first mounting component 356 and second mounting component 358, respectively, the sleeve 334 may shiftingly couple to the first shift fork 324. The sleeve 334 and first clutch assembly 332 may rotate and spin about the longitudinal axis 306 when drivingly coupled to the first shift fork 324.

The first sleeve engagement 372 may be fastened to the first mounting component 356 via a first fastener 452. Likewise, the second sleeve engagement 374 may be fastened to the second mounting component 358 via a second fastener 454. Portions of the first sleeve engagement 372 may be inserted through a first complementary hole and a second groove 460. The second groove 460 may have surfaces about, supporting, and in surface sharing contact with the first sleeve engagement 372. The first sleeve engagement 372 may be fastened to the first mounting component 356, such as when an appendage of the first sleeve engagement 372 is inserted into the first complementary hole of the first mounting component 356, and the first fastener 452 is inserted into a second complementary hole of the first mounting component 356. The first fastener 452 may prevent slipping or other movement of the first sleeve engagement 372 along the axis 455. Portions of the second sleeve engagement 374 may be inserted through a third complementary hole 458 and a third groove 462. The third groove 462 may have surfaces about, supporting, and in surface sharing contact with the second sleeve engagement 374. The second sleeve engagement 374 may be fastened to the second mounting component 358, such as when an appendage 457 of the second sleeve engagement may be inserted into the third complementary hole 458 of the second mounting component 358, and the second fastener 454 is inserted into a fourth complementary hole of the second mounting component 358. The second fastener 454 may prevent slipping or other movement of the second sleeve engagement 374 along the axis 455. The axis 455 may be lateral and perpendicular to the longitudinal axis 306. The axis 455 may be concentric to a plurality holes complementary of the first mounting component 356 and second mounting component 358, such as the third complementary hole 458.

The end 422 may have a plurality of splines 472 that may be complementary to a gear, such as the input gear or output gear described above, or another rotational element. Likewise, the shaft 308 may have a plurality of splines 474 that may be complementary to a plurality of splines or teeth of the first clutch assembly 332. The sleeve 334 may have a plurality of teeth 476. The teeth 476 may be complementary to a plurality of splines 478 of the first hub 336.

As the first sleeve 334 rotates, friction may be generated between the surfaces of the first groove 442, the first wall 444, and second wall 446 and the first sleeve engagement 372 and second sleeve engagement 374. To reduce the buildup of thermal energy and the friction on the surfaces of the first sleeve 334, the first sleeve engagement 372, and second sleeve engagement 374, lubricant may be supplied to the sleeve 334, the first sleeve engagement 372, and second sleeve engagement 374 via features of the first shift fork 324. For example, a lubricant may follow a flow path 480 to lubricate the first sleeve engagement 372 or the second sleeve engagement 374. The flow path 480 may be represented by a first set of dotted arrows.

The flow path 480 may begin when lubricant is splashed from a target gear complementary to the clutch assembly 332 in the direction of the first shift fork 324. Flow path 480 may also originate from the center of shaft 308. The flow path may originate at the end 422 and other portion of shaft 308. Shaft 308 may be hollow and have plurality of though holes to the hollow portion of the shaft 308. The rotation of the shaft 308 may send lubricant radially outward from the shaft 308 via the through holes. For either example, lubricant may splash from a rotational element supported and rotationally coupled to the end 422 and/or from end 422. Lubricant may splash against and coat a surface of the supportive arch 342. For this or another example, lubricant may be splashed from a rotational element, such as a gear, housed in the housing 312. The force of gravity and the adhesive force of the lubricant against the surface material of the first shift fork 324 may pull lubricant away from the surface of the supportive arch 342 and toward the surfaces of the first and second arms 348, 350. As the lubricant is pulled toward opposite arms, the flow path may split. Gravity and adhesive force may pull lubricant coating the first arm 348 toward the first inner surface 349. From the first inner surface 349 gravity and adhesive force may pull the lubricant to coat the first lobe 352. Lubricant may drip from the first lobe 352 into the first groove 442. Lubricant may drip from the first lobe 352 onto the first sleeve engagement 372. Lubricant may also be carried by the first groove 442 and other features of the sleeve 334 to coat the first sleeve engagement 372. Lubricant may be directed away from the inner surface 351 by the first notch 364 toward a tip on the first lobe 352. Lubricant may accumulate at and drip from the tip formed by the first lobe 352 and the first notch 364 onto the first sleeve engagement 372. Likewise, gravity and adhesive force may pull lubricant coating the second arm 350 toward the second inner surface 351. From the second inner surface 351 gravity and adhesive force may pull the lubricant to coat the second lobe 354. Lubricant may drip from the second lobe 354 into the first groove 442. Lubricant may drip from the second lobe 354 onto the second sleeve engagement 374. Lubricant may also be carried by the groove 442 and other features of the sleeve 334 to coat the second sleeve engagement 374. Lubricant may be directed away from the second inner surface 351 by the second notch 366 toward a tip on the second lobe 354. Lubricant may accumulate at and drip from the tip formed by the second lobe 354 and second notch 366 onto the second sleeve engagement 374. Lubricant may drip from the first sleeve engagement 372, the second sleeve engagement 374, and the sleeve 334 to a sump, such as the sump 228 of FIG. 2.

Turning to FIG. 4B, it shows a view 490 of the region 430. View 490 shows a position sensor 492. The position sensor 492 may estimate the position of the second target 426 in the recess 428 with respect to an axis parallel with axis 306. The position sensor 492 may estimate the change in position from a point along an axis parallel with axis 306 in the first direction 326 or second direction 328. Data of the position of the second target 426 may be used by a controller and/or computer processor communicatively coupled to the position sensor 492 to estimate the position of the second shift fork 414. As an example, the position sensor 492 may measure a distance 498. The distance 498 may be between a first surface 494 of the position sensor 492 and a second surface 496 of the second target 426. The distance of distance 498 may be variable and change as the second target 426 is actuated with the second shift fork 414.

A second position sensor of the same type as position sensor 492 may be used to measure the position of the first target 362 as it moves in a complementary recess opposite to the recess 428 across the axis 306. The second position sensor may measure the position of the first target 362 in a similar process to how position sensor 492 may measure the second target 426 as described above. The second position sensor may be communicatively coupled to a controller and/or computer processor. Data from the second position sensor may be used by the controller and/or computer processor to estimate the position of the first shift fork 324.

Turning to FIG. 5 it shows a third view 500 of the first shift fork 324, wherein the first shift fork is isolated from other components of the assembly 310 and the shaft 308. The first shift fork 324 may be positioned about an axis 512. The first shift fork 324 may be centered about the axis 512 The axis 512 may be parallel with the longitudinal axis 306, and therein may be longitudinal.

The first arm 348 may have a first face 516 that is continuous with the supportive arch 342. The second arm 350 may have a second face 518 that is continuous with the supportive arch 342. The first arm 348 and second arm 350 may be connected to the supportive arch via the first face 516 and second face 518, respectively. The first face 516 and second face 518 may be cast to the supportive arch 342. The first cantilever 344 and second cantilever 346 may extend from and have portions joined to the first and second faces 516, 518. The first face 516 may be raised as to be a greater thickness compared to the second face 518. The first face 516 and second face 518 may terminate at the curvature of the first inner surface 349 and second inner surface 351, respectively. The first lobe 352 may comprise a first tip 520 and the second lobe 354 may comprise a second tip 522. The first lobe 352 may have a first edge 528 and the second lobe 354 may have a second edge 530. The first tip 520 may be located between the first notch 364 and the first edge 528.

The second tip 522 may be located between the second notch 366 and the second edge 530. The first tip 520 may be positioned above and point toward a first sleeve engagement, such as first sleeve engagement 372 of FIG. 3. The second tip 522 may be positioned above and pointed toward a second sleeve engagement, such as second sleeve engagement 374 of FIG. 3.

The first inner surface 349 may have a curvature of a second radius 524 for the first arm 348. The second inner surface 351 may have a curvature of a third radius 526 for the second arm 350. The second radius 524 and the third radius 526 may be approximately the same distance. The first edge 528 may have a curvature of a fourth radius 529. The second edge 530 may have a curvature of a fifth radius 531. The fourth radius 529 and fifth radius 531 may be approximately the same distance. The fourth and fifth radii 529, 531 may be of a distance greater than the second and third radii 524, 526.

The first cantilever 344 may comprise two subsections in the form of a first section 532 and a second section 534, located on or nearest to the end of the first cantilever 344. Likewise, the second cantilever 346 may comprise two subsections in the form of a third section 536 and a fourth section 538, located on or nearest to the end of the second cantilever 346. Between the first section 532 and second section 534 may be a first shoulder 540. Likewise, between the third section 536 and fourth section 538 may be a second shoulder 542. The second section 534 and fourth section 538 may be of a first diameter 544. The first section 532 and third section 536 may be of a second diameter 546. The first shoulder 540 and second shoulder 542 may be of a third diameter 548. The other portions of the first cantilever 344 and second cantilever 346 may be of a fourth diameter 550. The fourth diameter 550, third diameter 548, and second diameter 546 may be greater than the first diameter 544. The fourth diameter 550 and third diameter 548 may be greater than the second diameter 546. The fourth diameter 550 and third diameter 548 may be approximately the same distance. The first section 532 and third section 536 may be of the second diameter 546 to provide clearances for fasteners of the housing 312 of FIG. 3.

The second section 534 may be inserted into a bushing assembly or a bearing assembly mounted to an inner surface or a depression of an inner surface of the housing 312 of FIG. 2. Likewise, the fourth section 538 may be inserted into a bushing assembly or a bearing assembly mounted to an inner surface or a depression of an inner surface of the housing 312. The second section 534 may support or be supported by a first type of bushing or a first type of bearing. The fourth section 538 support or be supported by a second type of bushing or a second type bearing. The first type of bushing and the second type of bushing may be the same type of bushing. The first type of bearing and the second type of bearing may be the same type of bearing. For an example of an embodiment, bushings may support and be supported by the second section 534 and the fourth section 538, such as the first type of bushing and second type of bushing respectively. For another example of an embodiment, bearings may support and be supported by the second section 534 and the fourth section 538, such as the first type of bearings and second type of bearings respectively. Bearings that support or may be supported by the second section 534 and fourth section 538 may be roller bearings or pin bearings. The bearings and bearing assembly that support or are supported by the second section 534 and fourth section 538 may support and allow the first shift fork 324 to slide smoothly in the first direction 326 or second direction 328 when assembled in the housing 312.

View 500 shows the offset arm 360 may extend upward in a vertical direction from the second cantilever 346. The offset arm 360 may comprise a first appendage 556 and a second appendage 558. The first and second appendages 556, 558 may extend upward from a curve 555. The curve 555, the first appendage 556, and the second appendage 558 may be located about a void that a shifting rod, such as shifting rod 224, may be positioned concentric to. For an example embodiment, the first and second appendages 556, 558 may comprise a third mounting component 552 and a fourth mounting component 554. The first appendage 556 may be fastened to the shifting rod via third mounting component 552. For this example, the second appendage 558 may be fastened to the shifting rod via the fourth mounting component 554. A clevis may comprise the third mounting component 552 and fourth mounting component 554. A fastener, such as a pin or bolt, may be passed through the third mounting component 552, a complementary through hole of the shifting rod, and the fourth mounting component 554 to fasten the offset arm 360 to the shifting rod. The curve 555 may be of a radius 559. The radius 559 may be large enough such that the curve 555 may be positioned about the shifting rod.

The first target 362 comprise a rib 563, a cavity 560, and an extension 561. The cavity 560 may have smoothed and beveled surfaces and edges. The cavity 560 may act as a clearance feature for assembly of appendage 457 through the third complementary hole 458. The cavity 560 may be positioned between the second mounting component 358 and the extension 561, with respect to a lateral axis, such as the x-axis of the reference axes 301. The cavity 560 may be positioned below the rib 563. For an example embodiment, the cavity 560 is positioned below the rib 563 when the first target 362 is positioned about the axis 512 in the third view 500. The second target 426 may comprise the same or approximately the same dimensioned features and components as the first target 362.

The first mounting component 356 may comprise a first hole 562. The first hole 562 may be concentric to a first boss 564. The second mounting component 358 may comprise a second hole 566. The second hole 566 may be concentric to a second boss 568. The first and second bosses 564, 568 may each have a surface that may be approximately normal to the axis 512, such as when the first shift fork 324 is positioned about the axis 512. The first hole 562 may be complementary to the first fastener 452. The first boss 564 may support and abut features of the first fastener 452, such as a head. Likewise, the second hole 566 may be complementary to the second fastener 454. The second boss 568 may support and abut features of the second fastener 454, such as a head. The first hole 562 and second hole 566 may be the second complementary hole and the fourth complementary hole described for FIG. 4A.

The extension 561 may be bent and corrugated such as to partially extend in a direction approximately perpendicular to the direction the other portions of the first target 362 may extend. Likewise, a portion of the extension 561 may extend in a direction approximately parallel to the direction the other portions the first target 362 may extend. For example, when the first shift fork 324 is positioned about the axis 512 as in view 500, the distance the rib 563 extends may be approximately parallel with axis 455. A first portion of the extension 561 may have a distance extend approximately longitudinally, perpendicular to axis 455. A second portion of the extension 561 may have a distance that extends approximately parallel with the rib 563 and axis 455.

Returning to the first and second lobes 352, 354, the first lobe 352 may be of a first thickness 572 and the second lobe 354 may be of a second thickness 574. When the first shift fork 324 is positioned about the axis 512, the first thickness 572 and second thickness 574 may be approximately parallel with the axis 512. The first thickness 572 may be variable, such that the first thickness 572 may decrease in distance closer to and at the edge of the first tip 520. Likewise, second thickness 574 may be variable, such that the second thickness 574 may decrease in distance closer to and at the edge of the second tip 522.

Returning to the first mounting component 356, the first mounting component 356 may have a plurality of platforms, such as a first platform 582 and a second platform 584. The first and second platforms 582, 584 may be cylindrical in shape and referred to herein as the first cylindrical platform 582 and the second cylindrical platform 584, respectively. Likewise, the second mounting component 358 may have a plurality of platforms, such as a third platform 586 and a fourth platform 588. The third and fourth platforms 586, 588 may be cylindrical in shape and referred to herein as the third cylindrical platform 586 and the fourth cylindrical platform 588, respectively. The first platform 582, second platform 584, third platform 586, and fourth platform 588 may be used in clamping when manufacturing the first mounting component 356 and second mounting component 358, such as via machining. The first shift fork 324 may have a plurality of other features that are raised or extend parallel with a surface from the material of the shift fork 324. For example, the second arm 350 may have a platform 590. The platform 590 may extend in a parallel direction with a longitudinal axis, such as axis 512. The platform 590 may be an ejector feature for the first arm 348 after casting.

Turning to FIG. 6, it shows a fourth view 600 of the assembly 310. The fourth view 600 is a sectional view that may be taken on a line 304 of FIG. 3. The fourth view 600 may be normal to the axis 455. The fourth view 600 shows internal components of the shifting assembly 322 enclosed by housing 312 and not visible via hole 318 in previous views.

Fourth view 600 shows the housing 312 may comprise a cavity 610. The cavity 610 may be to the second direction 328 of the structure 416. The cavity 610 may house portions of a first gear 614. The cavity 610 may house a ring gear 612 and a second gear 616. The ring gear 612 may be positioned about the second gear 616. The second gear 616 may be positioned radially about a portion of the first gear 614, with respect to axis 306. The first gear 614 may be positioned radially about the shaft 308, with respect to axis 306. A second clutch assembly 624 may comprise the structure 416 and have components shiftingly coupled to the second shift fork 414. The first gear 614 may have an extension 620. The extension 620 may extend in the first direction 326 from a pitch circle 621.

The first gear 614 comprise or be drivingly coupled to the first gear collar 410. The second gear 616 may comprise or be drivingly coupled to a second gear collar 622. The first gear collar 410 may be engaged by the first clutch assembly 332 or a second clutch assembly 624. The second gear collar 622 may be engaged by the second clutch assembly 624. The second clutch assembly 624 may comprise the structure 416. The structure 416 may comprise a hole 626. The hole 626 may be splined and house a second sleeve 628. The second sleeve 628 may be positioned within and meshed with the hole 626 via a plurality of complementary teeth or splines to the splines of the hole 626. The second sleeve 628 may be position about and be meshed with the second hub 412 via a plurality of complementary teeth or splines to teeth of the second hub 412. The second sleeve 628 may be shiftingly coupled to the second shift fork 414, such that the second sleeve 628 may shift in the same direction and approximately the same distance with the second shift fork 414. The second shift fork 414 may slide the second sleeve 628 in the first direction 326 or second direction 328 from the second hub 412. The first sleeve 334 may be positioned approximately radially about the hub 336 and/or the first gear collar 410. The second sleeve 628 may be positioned approximately radially about the second hub 412 and/or the first gear collar 410. The second sleeve 628 may also be positioned approximately radially about the second hub 412 and/or second gear collar 622.

The first gear 614 may be a target gear for the first clutch assembly 332 and second clutch assembly 624. Likewise, the second gear 616 may be a target gear for the second clutch assembly 624. The first gear 614 may be the first gear 232 or third gear 236 from FIG. 2. Likewise, the second gear 616 may be the first gear 232 or third gear 236, wherein the second gear 616 may be the third gear 236 if the first gear 614 is the first gear 232, or the second gear 616 may be the first gear 232 if the first gear 614 is the third gear 236.

The first gear 614 may be a target gear for the first sleeve 334 and the second sleeve 628, such that the first and second sleeves 334, 628 may engage with the first gear 614. When the first sleeve 334 engages with the first gear 614, the first clutch assembly 332 may selectively and rotationally couple to the first gear 614. The first clutch assembly 332 may drivingly couple the first gear 614 to the first hub 336 when rotationally coupled to the first gear 614. When the second sleeve 628 engages with the first gear 614, the second clutch assembly 624 may selectively and rotationally couple to the first gear 614. The second clutch assembly 624 may drivingly couple the first gear 614 to the second hub 412 when rotationally coupled to the first gear 614. Likewise, the second gear 616 may be a target gear for the second sleeve 628, such that the second sleeve 628 may engage with the second gear 616. When the second sleeve 628 engages with the second gear 616, the second clutch assembly 624 may selectively and rotationally couple to the second gear 616. The second clutch assembly 624 may drivingly couple the second gear 616 to the second hub 412 when rotationally coupled to the second gear 616.

A plurality of first bearings 632 may be positioned radially about the shaft 308. A plurality of second bearings 634 may be positioned radially about the extension 620. Likewise, a third bearing 636a, a fourth bearing 636b, and a fifth bearing 636c may be positioned radially about the extension 620. The first gear 614 may be positioned about and be supported by the first bearings 632. The second gear collar 622 and second hub 412 may be positioned about and be supported by the second bearings 634. At least one of the second bearings 634 may be complementary to and support the second gear collar 622. At least one of the second bearings 634 may be complementary to and support the second hub 412. The first gear collar 410 may not be supported by bearings, and may be physically and rotationally coupled to the first gear 614 via the extension 620. The third bearing 636a may be positioned between first gear 614 and the second gear collar 622 when positioned about the extension 620. The fourth bearing 636b may be positioned between the second gear collar 622 and the second hub 412 when positioned about the extension 620. The fifth bearing 636c may be positioned between the second hub 412 and the first gear collar 410 when positioned about the extension 620. The third bearing 636a may prevent surface sharing contact between and dislodgment of the second gear collar 622 from the first and second gears 614, 616. The fourth bearing 636b may prevent surface sharing contact between and dislodgment of the second gear collar 622 and the second hub 412. The fifth bearing 636c may prevent surface sharing contact between and dislodgment of the second hub 412 and the first gear collar 410. It is to be appreciated, that the use of bearings may be non-limiting. For example, a plurality of bushings may be used in place of the first bearings 632 and the second bearings 634. Likewise, for this or another example, a bushing may be used in place of each of the third bearing 636a, fourth bearing 636b, and fifth bearing 636c.

The first gear collar 410 may have a plurality of first teeth 642 and a plurality of second teeth 644 that extend radially from the perimeter of the first gear collar 410. The plurality of first teeth 642 may be complementary to and mesh with the teeth 476 of FIG. 4A. The plurality of second teeth 644 may be complementary to and mesh with teeth of the second sleeve 628. The teeth of the second sleeve 628 may be positioned about an inner diameter 647 of the second sleeve 628. The teeth 476 may extend radially toward the axis 306 when the first sleeve 334 is positioned about the axis 306. The teeth of the second sleeve 628 may extend radially toward the axis 306 when the second sleeve 628 is positioned about the axis 306.

The second gear collar 622 may have an extension; such as a flange 648. The flange 648 may extend radially and in the second direction 328 from the second gear collar 622. The flange 648 may abut the second gear collar 622 at a counter hole 650. The counter hole 650 may have edges positioned radially about the flange the second gear 616. A fastener 652 may fasten the flange 648 against the counter hole 650. When fastened against the counter hole 650, the flange 648 may fasten and rotationally couple the second gear collar 622 to the second gear 616. Likewise, a fastener 654 may fasten and rotationally couple the first gear collar 410 to the extension 620. The fastener 654 may be ring shaped. The fastener 652 may be positioned radially about the extension 620, such as about and inserted into a groove 656. The groove 656 may prevent movement of the fastener 654 in the first direction 326 or second direction 328 without deliberate force. The fastener 654 may prevent the first gear collar 410 from becoming dislodged from a position about the extension 620. The fastener 654 may prevent movement of the first gear collar 410 in the first direction 326 from the position about the extension 620.

The shifting assembly 322 may enable three speeds. Each mode that enables a different speed may be referred to herein as a gear, such as a first gear mode, a second gear mode, and a third gear mode. For an example embodiment, the shifting assembly 322 may enable the first gear mode via engagement of the second sleeve 628 and second gear 616. The shifting assembly 322 may enable the second gear mode via engagement of the second sleeve 628 and the first gear 614. The shifting assembly 322 may enable a third gear mode via engagement of the first sleeve 334 and the first gear 614. To engage in a first gear mode, the second sleeve 628 may be slid in the second direction 328 to engage the second gear collar 622. The second sleeve 628 may engage with the second gear collar 622 via the teeth of the second sleeve 628 meshing with the third teeth 646. To engage in a second gear mode, the second sleeve 628 may be slid in the first direction 326 to engage with the first gear collar 410. The second sleeve 628 may engage with the first gear collar 410 via the teeth of the second sleeve 628 meshing with the second teeth 644. To engage in the third gear mode, the first sleeve 334 may be slid in the second direction 328 to engage the first gear collar 410. The first sleeve 334 may engage with the first gear collar 410 via the teeth 476 meshing with first teeth 642. In the first and second gear modes, the first sleeve 334 may not be engaged with the first gear collar 410. In the third gear mode, and the second sleeve 628 may not be engaged with either the first gear collar 410 or second gear collar 622.

View 600 also shows a fastener 662. The fastener 662 may be one of a plurality of fasteners complementary to holes 320 and may be used to fasten a cover to the flange 314 and/or flange 314 to the housing 312.

The lubricant from the first gear 614 may be splashed against the first shift fork 324, the second shift fork 414, and the structure 416. For example, lubricant on the extension 620 may be splashed radially to coat the first shift fork 324, the second shift fork 414, and the structure 416. Lubricant may be splashed to the extension 620 via teeth of the first gear 614 or from shaft 308. Shaft 308 may be hollow with and comprise a passage 664. Lubricant may be housed and flow through passage 664. Lubricant may be spread to a plurality of outer surfaces 668 of the shaft 308 via a plurality of through holes 666. The through holes 666 may be the through holes described with respect to the flow path 480 of FIG. 4A. Lubricant may be driven radially outward to the outer surfaces 668 via the through holes 666 via forces generated by the spinning or rotation of the shaft 308 about the axis 306. Lubricant on the outer surfaces 668 may be flung or be carried further outward in a radial direction from the shaft 308 to splash other components of the assembly 310. For example, lubricant may be flung from shaft 308 to the first shift fork 324. For another example, lubricant may be flung from the shaft 308 to the first gear 614, and from components of the first gear 614, such as the extension 620, to features such as the first shift fork 324, the second shift fork 414, the first gear collar 410, the second hub 412, the second gear collar 622, the second bearings 634, the third bearings 636a, the fourth bearings 636b, the fifth bearings 636c.

Lubricant, such as oil, may follow a flow path 670. The lubricant following flow path 670 may lubricate the components of the shifting assembly 322. Flow path 670 starts at the first gear 614, where lubricant may be splashed to the first gear 614 via another gear in mesh. Lubricant may coat the first gear 614 including the teeth about the pitch circle 621 and the extension 620. Additionally or alternatively, lubricant may be flung from the outer surfaces 668 and splash onto the extension 620. Lubricant on the flow path 670 may be splashed from the extension 620 along a plurality tributary flow paths, such as a first tributary 672, a second tributary 674, a third tributary 676, and a fourth tributary 678. The lubricant from the first tributary 672 may splash and lubricate the third bearing 636a, the second gear collar 622, and one of the second bearings 634 supporting the second gear collar 622. Lubricant from the second tributary 674 may splash and lubricate the fourth bearing 636b, the second gear collar 622, one of the second bearings 634 supporting the second gear collar 622, the second hub 412, and one of the second bearings 634 supporting the second hub 412. Lubricant from the third tributary 676 may splash and lubricate the fifth bearing 636c, the second hub 412, one of the second bearings 634 supporting the second hub 412, and the first gear collar 410. Lubricant from the fourth tributary 678 may splash and lubricate the first gear collar 410 and components of the first clutch assembly 332. Lubricant from the third tributary 676 and fourth tributary 678 may combine into a fifth tributary 680. The fifth tributary 680 may splash and lubricate the features and components of the first shift fork 324, the second shift fork 414, and the structure 416. Features of the first shift fork 324, such as the first lobe 352 and second lobe 354 of FIG. 3, may direct lubricant toward the first sleeve 334 and components that shifting couple the first sleeve 334 to the first shift fork 324, such as the first sleeve engagement 372 and second sleeve engagement 374 of FIG. 3. Likewise, features of the second shift fork 414, such as features of similar dimensions to the first lobe 352 and second lobe 354, may direct lubricant toward the structure 416, second sleeve 628, and components that shiftingly couple the second sleeve 628 to the second shift fork 414. The components that shiftingly couple the second sleeve 628 to the second shift fork 414 may be sleeve engagements of the same type or approximately the same dimensions as the first sleeve engagement 372 and second sleeve engagement 374.

In this way, sleeve engagements, such as shift pads, of a sleeve and shift fork may be lubricated passively when a synchronizer is engaged or disengaged with a target gear. The sleeve engagements may receive lubrication directly via dripping. Lubricant, such as oil, may be supplied to lubricate the sleeve engagements without the use of a powered or pressure driven device, such as a sprayer, or fresh lubricant from a sump, wherein the fresh lubricant has not been used to lubricate another component of the transmission. The lubricant may be provided via splashing from a target gear to the arch-shaped portion of a shift fork. The shift fork may comprise arms with lobes, wherein the lobes may be fins or similar structures. The lobes may direct lubricant coating the shift fork to the sleeve engagements and areas of contact between the sleeve engagements and the sleeve.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of prime movers, internal combustion engines, and/or transmissions. The subject matter of the present disclosure includes all novel and non-obvious combinations and sub-combinations of the various systems and configurations, and other features, functions, and/or properties disclosed herein.

Note that the example control and estimation routines included herein can be used with various engine, electric machine, transmission, and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A transmission shift fork comprising:
    an arch-shaped portion, wherein the arch-shaped portion comprises and is continuous with a first arm and a second arm; and
    a pair of lobes radially and inwardly projecting from an inner surface of the arch-shaped portion for directing oil to a sleeve engagement region of a clutch, wherein the inner surface comprises a first inner surface of the first arm and a second inner surface of the second arm, and wherein:
    the pair of lobes comprises a first lobe and a second lobe,
    the first lobe is physically coupled to the first arm and the second lobe is physically coupled to the second arm,
    the first lobe extends from the first inner surface of the first arm and the second lobe extends from the second inner surface of the second arm,
    the first lobe has a first tip and the second lobe has a second tip,
    the first tip is positioned above and pointed toward a first sleeve engagement and the second tip is positioned above and pointed toward a second sleeve engagement, and
    a first notch is between the first tip and the first inner surface and a second notch is between the second tip and the second inner surface.

2. The transmission shift fork of claim 1, wherein the arch-shaped portion of the shift fork is a singular and unitary component.

3. The transmission shift fork of claim 1, wherein the first arm comprises a first mounting component and the second arm comprises a second mounting component, where the first sleeve engagement and the second sleeve engagement are mounted to the first mounting component and the second mounting component, respectively.

4. The transmission shift fork of claim 3, wherein the arch-shaped portion of the shift fork is configured to be positioned radially outboard of the clutch.

5. The transmission shift fork of claim 4, wherein the first sleeve engagement and the second sleeve engagement are in surface sharing contact with a sleeve of the clutch, wherein the sleeve engagement region comprises a first area of contact for the first sleeve engagement and a second area of contact for the second sleeve engagement.

6. The transmission shift fork of claim 5, wherein the clutch is a synchronizer.

7. The transmission shift fork of claim 5, wherein the first lobe and the second lobe are positioned radially outboard from a groove of the sleeve, wherein the sleeve has features about and in surface sharing contact with the first sleeve engagement and second sleeve engagement.

8. The transmission shift fork of claim 1, wherein the arch-shaped portion extends radially around a central axis, wherein the first lobe has a first thickness that extends parallel to the central axis and the second lobe has a second thickness that extends parallel to the central axis, wherein the first thickness decreases in distance between the first inner surface and the first tip and the second thickness decreases in distance between the second inner surface and the second tip.

9. A transmission shift fork, comprising:
    a first arm positioned on a first side of the transmission shift fork and terminating at a first mounting component;
    a second arm positioned on a second side of the transmission shift fork and terminating at a second mounting component;
    an arch-shaped portion coupling the first arm to the second arm;
    an inner surface formed from respective inner surfaces of the first arm, the second arm, and the arch-shaped portion, wherein the inner surface has a first curvature that extends radially around a first axis and that decreases in radius from the arch-shaped portion to the first mounting component, and decreases in radius from the arch-shaped portion to the second mounting component;
    a first fin extending radially inward, from the inner surface toward the first axis, on the first side, the first fin having a second curvature of a second radius that is larger than a radius of the first curvature at the first arm, such that the first fin increases in width along the first edge; and
    a second fin extending radially inward, from the inner surface toward the first axis, on the second side, the second fin having a third curvature of a third radius that is larger than a radius of the first curvature at the second arm, such that the second fin increases in width along the second edge.

10. The transmission shift fork of claim 9, wherein the first fin extends from the inner surface to the first edge, and wherein the second fin extends from the inner surface to the second edge.

11. The transmission shift fork of claim 10, wherein the first edge extends from the inner surface to a first tip and the second edge extends from the inner surface to a second tip.

12. The transmission shift fork of claim 11, wherein the first fin includes a first notch positioned between the inner surface and the first tip, and wherein the second fin includes a second notch positioned between the inner surface and the second tip.

13. An assembly, comprising:
- a sleeve coaxially arranged around a hub, the hub coaxially arranged around a shaft extending along a first axis; and
- a shift fork, comprising:
  - a first arm terminating at a first mounting component coupled to a first sleeve engagement of the sleeve;
  - a second arm coupled to the first arm via an arch-shaped portion, the second arm terminating at a second mounting component coupled to a second sleeve engagement of the sleeve;
  - an inner surface extending radially around the first axis; and
  - a pair of fins extending radially inward, toward the first axis, from the inner surface, the pair of fins including a first fin extending from the inner surface at the first arm, the first fin increasing in width from the arch-shaped portion toward the first mounting component, and a second fin extending from the inner surface at the second arm, the second fin increasing in width from the arch-shaped portion toward the second mounting component.

14. The assembly of claim 13, wherein the first fin includes a first edge terminating at the inner surface and at a first tip and the second fin includes a second edge terminating at the inner surface and at a second tip.

15. The assembly of claim 14, wherein the first tip is positioned vertically above the first sleeve engagement and the second tip is positioned vertically above the second sleeve engagement.

* * * * *